United States Patent
Cantelobre

(10) Patent No.: US 8,220,933 B1
(45) Date of Patent: Jul. 17, 2012

(54) METHOD AND APPARATUS FOR DATA TRANSFER USING AN OPTICAL LINK IN A PROJECTOR SYSTEM

(75) Inventor: Michel Cantelobre, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 790 days.

(21) Appl. No.: 12/264,143

(22) Filed: Nov. 3, 2008

(51) Int. Cl.
 *G03B 21/00* (2006.01)
 *H04N 5/64* (2006.01)
 *G02F 1/00* (2006.01)
(52) U.S. Cl. .................. 353/31; 348/744; 348/756
(58) Field of Classification Search ............. 396/429; 340/854.7; 353/98; 348/744, 756; 398/118, 398/119, 120
See application file for complete search history.

(56) References Cited

U.S. PATENT DOCUMENTS

| | | | |
|---|---|---|---|
| 6,633,430 B1 * | 10/2003 | Monnard et al. | 359/337.11 |
| 6,670,603 B2 | 12/2003 | Shimada et al. | |
| 6,869,185 B2 | 3/2005 | Kaminsky et al. | |
| 6,995,622 B2 | 2/2006 | Partridge et al. | |
| 7,252,394 B1 | 8/2007 | Fu | |
| 2004/0252178 A1 | 12/2004 | Yoshikawa et al. | |
| 2005/0141069 A1 | 6/2005 | Wood et al. | |
| 2005/0183273 A1 * | 8/2005 | Amron et al. | 33/289 |
| 2006/0289653 A1 | 12/2006 | Wittenberg et al. | |
| 2007/0046898 A1 | 3/2007 | Conner | |
| 2009/0066916 A1 | 3/2009 | Brown | |
| 2009/0067846 A1 * | 3/2009 | Yu et al. | 398/128 |
| 2010/0245773 A1 * | 9/2010 | Arita | 353/31 |

FOREIGN PATENT DOCUMENTS

JP      2000174707 A  *  6/2000

OTHER PUBLICATIONS

Pablo Gomez, "State-of-the-art of MEMS Technology for Design and Fabrication of Micro-Mirrors", 2003, 14 pages.
Chuanwei Wang, et al., "Implementation of phase-locked loop control for MEMS scanning mirror using DSP", ScienceDirect, Sensor and Actuators A 133, 2007, p. 243-249.
Randy Sprague, et al., "Bi-axial magnetic drive for Scanned Beam Display mirrors", Proc. of SPIE, vol. 5721, 2005, p. 1-13.
James S. Brown, "System for Suppressing Undesirable Oscillations in a MEMS Scanner", U.S. Appl. No. 12/283,759, filed Sep. 16, 2008.
James S. Brown, "Method and System for Operating a MEMS Scanner on a Resonant Mode Frequency", U.S. Appl. No. 12/286,615, filed Oct. 1, 2008.

(Continued)

*Primary Examiner* — Georgia Y Epps
*Assistant Examiner* — Danell L Owens
(74) *Attorney, Agent, or Firm* — Eugene C. Conser; Wade J. Brady, III; Frederick J. Telecky, Jr.

(57) ABSTRACT

A projection system for projecting an output image. The projection system comprises 1) a plurality of laser diodes, each laser diode generating a light beam; 2) combiner optics for combining light beams from the laser diodes to generate an output light beam; and a MEMS mirror module for receiving the output light beam and generating a scanning light beam operable to form the output image on a projection surface. A controller operates the projection system in a first mode in which the projection system projects an output image and operates the projection system in a second mode in which the projection system transmits data to an external device using a light beam from one of the plurality of laser diodes.

20 Claims, 2 Drawing Sheets

OTHER PUBLICATIONS

James S. Brown, "Method and System for Generating a Drive Signal for a MEMS Scanner", U.S. Appl. No. 12/286,605, filed Oct. 1, 2008.

Shorya Awtar, et al., "Two-Axis Optical MEMS Scanner", Proc. ASPE Annual Meeting, Oct. 2005, Norfolk, VA, Paper No. 1800, 4 pages.

* cited by examiner

METHOD AND APPARATUS FOR DATA TRANSFER USING AN OPTICAL LINK IN A PROJECTOR SYSTEM

TECHNICAL FIELD

This disclosure is generally related to projector systems and, more specifically, to a pico-projector that uses a red laser diode as an optical link for transferring data to another device.

BACKGROUND

Solid-state light sources are used in a number of well-known video applications, including video projectors and rear-projection television systems. Common solid-state light sources include semiconductor edge-emitting laser diodes (LDs), vertical cavity surface-emitting laser diodes (VC-SELs), diode pumped solid-state frequency doubled (DPSSFD) lasers, and light-emitting diodes (LEDs), among others. Laser-based and LED-based video projectors have been used extensively in business environments and have recently come into wide use in large-screen projection systems in home theaters.

Various laser-based and LED-based projection systems are described in U.S. Pat. Nos. 7,244,032 (Inamoto), 7,252,394 (Fu), 7,255,445 (Kojima), 7,304,795 (Yavid), and 7,355,657 (Chilla). The disclosures of U.S. Pat. Nos. 7,244,032, 7,252,394, 7,255,445, 7,304,795, and 7,355,657 are hereby incorporated by reference into the present disclosure as if fully set forth herein.

The miniaturization of projection systems has led to the development of so-called "pico-projectors" that may be embedded in other systems or may be implemented as stand-alone devices. Stand-alone devices include, by way of example, pocket or ultra-mobile projectors that maybe be powered from a battery or an external power source and have a wide range of input options. Embedded applications include, for example, mobile phones and heads-up displays for vehicle dashboards.

An exemplary pico-projector system is the PicoP™ projector engine developed by Microvision, Inc., which has a form factor suitable for implementation in a mobile phone, a vehicle heads-up display (HUD), and other hand-held portable device. The PicoP engine includes RGB laser sources, a micro-electro-mechanical system (MEMS) scanning mirror, optics and video processing electronics for receiving video data from a source and generating an image to be projected on any desired surface (e.g., screen, wall, paper, chair back, etc.). Another exemplary pico-projection system is the Necsel™ projector developed by Novalux, Inc.

However, pico-projection systems face a number of technical problems that are not as critical in larger projection systems, such as table-top projectors, rear-projection televisions, and home theatre projection systems. One of the chief technical problems is power reduction, since many pico-projectors operate mostly or even exclusively on battery power. Advantageously, power reduction also reduces the heat produced by the projector.

Cost reduction is also significant, particularly in embedded systems. For example, the total price of a mobile phone, including the embedded pico-projector, may be effectively limited by consumer demand to a few hundred dollars. Thus, the cost of the pico-projector components must be a fraction of the cost of the projector components of, for example, a rear-projection television.

Therefore, there is a need in the art for pico-projection systems that are ultra-compact, operate at reduced power, and produce less heat. There is also a need for pico-projection systems that cost less and provide enhanced capabilities to a host system, such as a mobile phone.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
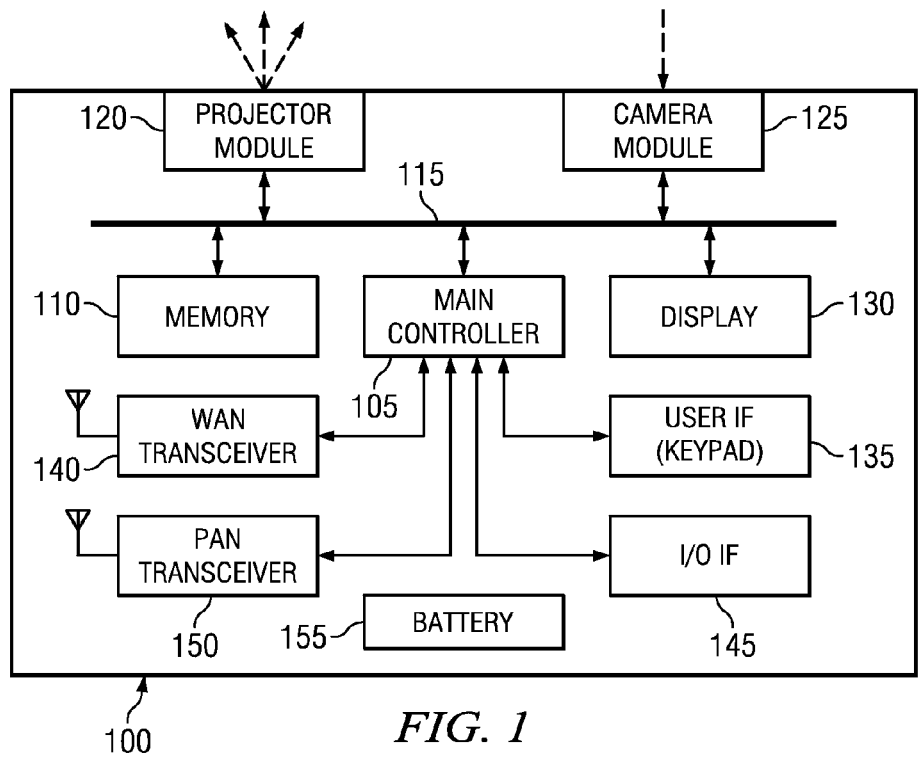
FIG. 1 is a high-level block diagram of a mobile phone that includes an embedded pico-projection system according to one embodiment of the present disclosure.

FIG. 1 is a high-level block diagram of mobile phone 100, which includes an embedded pico-projection system according to one embodiment of the present disclosure. Mobile phone 100 is merely one illustrative embodiment of the present invention. Those skilled in the art will readily understand that the pico-projection system described herein may be embedded in other types of portable devices or may be implemented as a stand-alone device.

Mobile phone 100 comprises main controller 105, memory block 110, communication bus 115, projector module 120, camera module 125, display block 130, user interface (IF) 135, wide-area network (WAN) transceiver 140, input-output interface (I/O IF) 145, personal-area network (PAN) transceiver 150, and battery 155. With the exception of projector module 120, mobile phone 100 and the components therein are a conventional architecture common to most mobile phones.

Main controller 105 is the central processor that supervises the overall operation of mobile phone 100. Memory block 110 includes one or more conventional read-only memory (ROM) devices, random access memory (RAM) devices (including a Flash RAM), and (optionally) a removable (SD) memory card. Display block 130 comprises typical LCD color display circuitry that is common to most mobile phones. Communication bus 115 enables the transfer of data between main controller 105, memory 110 and display 130, as well as projector module 120 and camera module 123.

User IF 135 may include a conventional keypad and navigation buttons, as well as a touch screen, for receiving input commands and data from the operator of mobile phone 100. I/O IF 145 comprises a communication bus connector, such as, for example, a USB interface that enables main controller 105 to communicate with external devices. I/O IF 145 may also comprise a power supply interface for connecting mobile phone 100 to an external power supply in order to recharge battery 155. Mobile phone 105 operates from the external power supply when connected via I/O IF 145 and operates from battery 155 when disconnected.

WAN transceiver 140 is a long-range transceiver that enables mobile phone 100 to communicate voice and/or data traffic with a wide area network (e.g., a cellular network) via one or more conventional wireless protocols, including, for example, GSM, TDMA, CDMA, WCDMA, WiBro, WiMAX, OFDMA, and the like. PAN transceiver 140 is a very short-range transceiver that enables mobile phone 100 to communicate with a nearby wireless device. PAN transceiver 140 may be, for example, a Bluetooth transceiver that communicates with a wireless headset, a personal computer (PC), or a peripheral device.

Camera module 125 is a conventional embedded camera that is common to many mobile phones. Camera module 125 may comprise, for example, a flash element, a light sensor for sensing ambient light, and camera optics for capturing a still photograph (e.g., a JPEG file) in a first mode or a movie or video file (e.g., AVI or MPEG file) in a second mode. Captured photos or video files may be stored in memory block 110, particularly in an SD card.

Projector module 120 is a pico-projector device (as described hereafter) that uses, for example, three laser diodes (red, green, blue) to project an image onto any suitable surface, such as a wall, a screen, a sheet of paper, a desktop, and the like. Main controller 105 controls projector module 120 in response to user commands that may be received via user IF 135 or external commands that may be received via PAN (Bluetooth) transceiver 150. By way of example, a user may enter commands that cause main controller 105 to retrieve a slide show presentation file from memory 110 and to display the slides via projector module 120 as well as display block 130.

Figure 2:
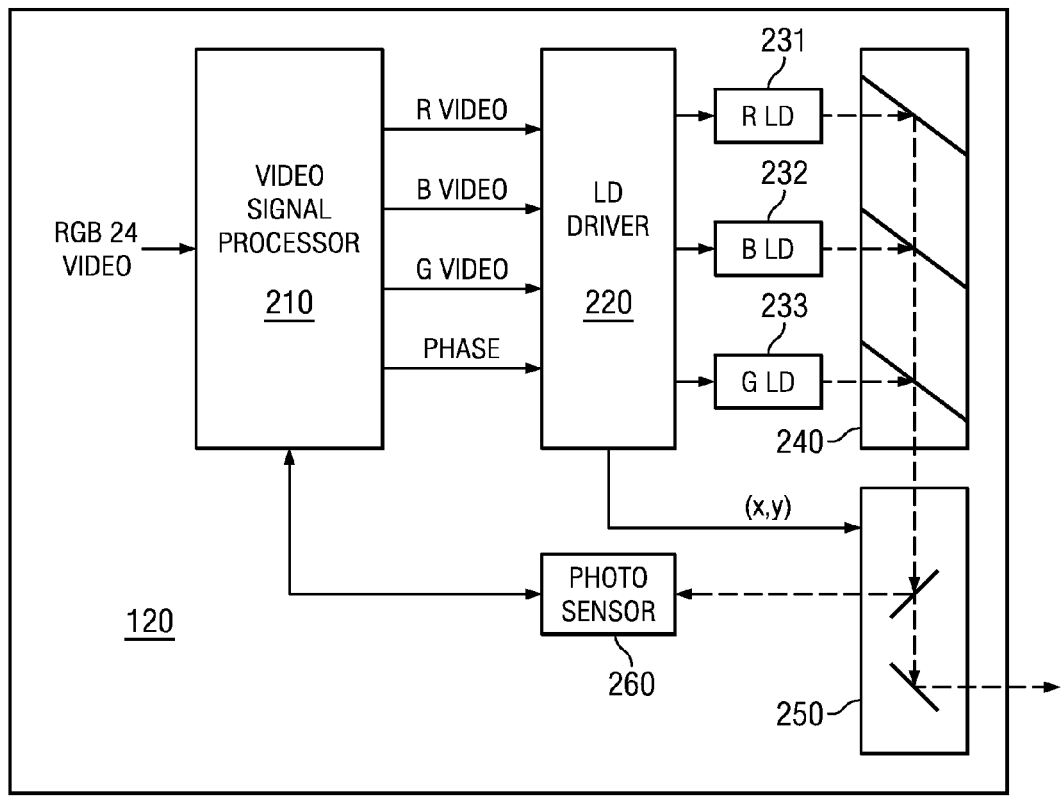
FIG. 2 is a block diagram of selected portions of the projector module in FIG. 1 according to one embodiment of the present disclosure.

FIG. 2 is a block diagram of selected portions of projector module 120 according to one embodiment of the present disclosure. Projector module 120 comprises video signal processor 210, laser diode driver 220, red laser diode (R LD) 231, blue laser diode (B LD) 232, green laser diode (G LD) 233, combiner optics 240, micro-electromechanical system (MEMS) mirror module 250, and photo sensor 260. The components and operation of projector module 120 are generally well-known. Pico-projectors similar to projector module 120 are commercially available, including, for example, the PicoP projection system made by Microvision, Inc.

Video signal processor (VSP) 210 receives an input stream of RGB 24 video data and performs a number of conventional video processing operations, such as warping, frame rate conversion, video correction, and the like. VSP 210 outputs final video signals, R (red) Video, B (blue) Video, and G (green) Video, and Phase, that control red laser diode 231, blue laser diode 232, and green laser diode 233. LD driver 220 converts the R Video, B Video, G Video, and Phase signals to laser diode bias voltages and bias currents that control the coherent light generated by laser diodes 231, 232, and 233. The colored laser light beams generated by laser diodes 231, 232, and 233 are combined into an output light beam by combiner optics 240.

LD driver 220 also generates (x,y) control signals that cause MEMS mirror module 250 to generate a scanning pattern that converts the light stream output by combiner optics 240 into a two-dimensional (2D) projected image. During a calibration mode, LD driver 220 also generates (x,y) control signals that deflect the output of combiner optics 240 into photo sensor 260, in order to measure the color of the light generated by each one of laser diodes 231, 232, and 233. During the calibration operation, LD driver 220 may turn on only one of laser diodes 231, 232, and 233 at a time in order to measure each red, blue or green light beam individually.

Figure 3:
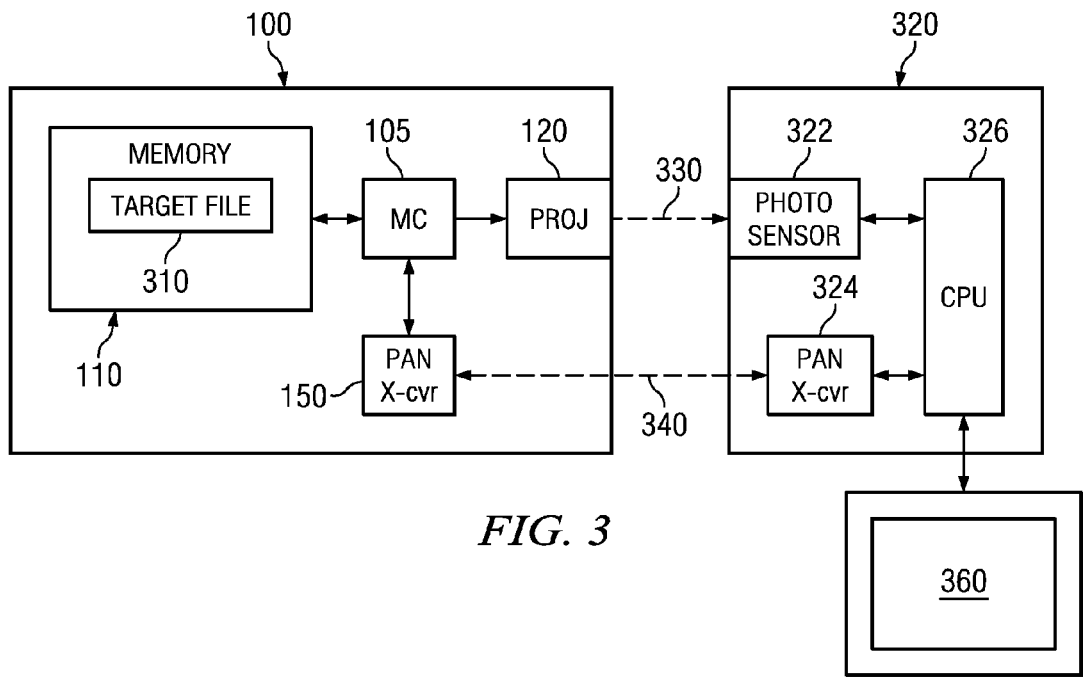
FIG. 3 illustrates a system for using an embedded pico-projection system in a data transfer mode according to one embodiment of the present disclosure.

FIG. 3 illustrates a system for using an embedded pico-projection system in a data transfer mode according to one embodiment of the present disclosure. In FIG. 3, mobile phone 100 transfers target file 310 in memory 110 to, for example, set-top box (STB) 320, which is connected to television 360. STB 320 comprises photo sensor 322, PAN transceiver 324, and central processing unit (CP) 326. PAN transceiver 324 may be, for example, a Bluetooth transceiver.

According to the principles of the present invention, projector module 120 may operate in a first operating mode in which projector module 120 projects a video image on a screen, wall, or other surface in a conventional manner by combining red, blue and green light beams from laser diodes 231, 232, and 233. However, projector module 120 also may operate in a second operating mode in which projector module 120 operates as a high-speed optical transmitter that transfers data to another device using a laser beam from one of laser diodes 231, 232, and 233. In a preferred embodiment, projector module 120 uses red laser diode 231 to transmit to an external device (although blue laser diode 232 and green laser diode 233 may also be used).

Conventional optical transmitters using a beam of coherent red light to transmit data are well-known in the prior art and need not be explained herein in greater detail. However, the present invention is unlike conventional optical transmitters in that the existing red laser diode of a projection system is re-used as an optical transmitter, thereby eliminating the need for a separate high-speed transmitter (RF, IR or optical) in mobile phone 100.

Projector module 120 may be switched from the first mode (projector mode) to the second mode (optical transmitter mode) in a number of conventional ways. In one embodiment, the operator may place mobile phone 100 next to set-top box (STB) 320 with the lens of projector module 120 pointed at photo sensor 322. The operator can then enter keyboard commands that activate red laser diode 231 and cause it to establish optical link 330 that transmits target file 310 to STB 320. STB 320 and mobile phone 100 may communicate on RF link 240 between PAN transceivers 150 and 324 in order to help set up optical line 330. Assuming STB 320 comprises some type of video storage system, target file 320 may be, for example, an MPEG movie file that CPU 326 stores on a disk (not shown) or other storage media in STB 320.

Alternatively, projector module 120 may be switched from the first mode (projector mode) to the second mode (optical transmitter mode) simply by being placed near STB 320 with the lens of projector module 120 pointed at photo sensor 322. Assuming PAN transceivers 150 and 324 are Bluetooth (or similar) transceivers, PAN transceivers 150 and 324 may automatically detect one another and target file 310 may be transferred automatically to STB 320 under control of CPU 326 and without manual input from an operator.

In an advantageous embodiment of the present invention, mobile phone 100 may transmit and receive with a second mobile phone 100a, so that mobile-to-mobile optical transfer is accomplished. In such an embodiment, photo sensor 260 in mobile phone 100 and a similar photo sensor 260a in the second mobile phone 100a are used in a manner similar to photo sensor 322 in STB 320 in order to receive optically transmitted data from the other mobile phone.

Figure 4:
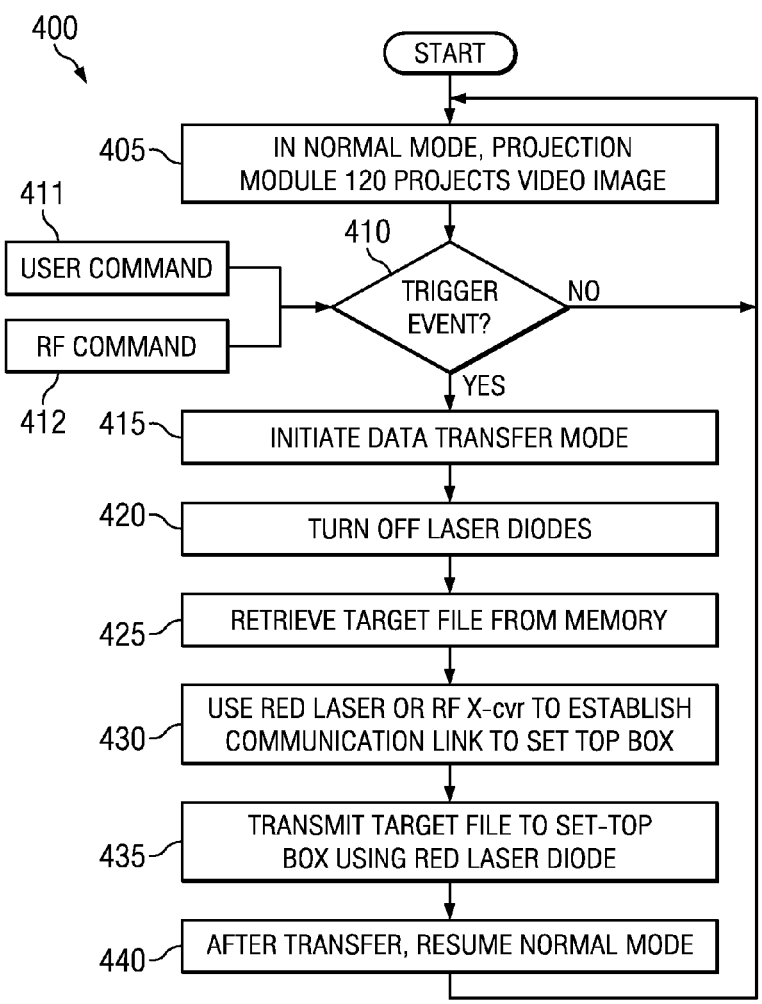
FIG. 4 is a flow diagram illustrating the use of an embedded pico-projection system in a data transfer mode according to one embodiment of the present disclosure.

FIG. 4 depicts flow diagram 400, which illustrates a data transfer operation using an embedded pico-projection system according to one embodiment of the present disclosure. Initially, projection module 120 operates in normal (or projector) mode and projects a video image (process step 405).

Main controller (MC) 105 in projection module 120 routinely searches to detect a trigger event (process step 410). The trigger event may be a manual command entered by a user (process step 411) or may be a command message received in an RF channel by PAN transceiver 150 (process step 412). If a trigger event is not detected, projection module 120 continues to operate in projector mode.

If a trigger event is detected, MC 105 in projection module 120 initiates data transfer mode (or optical transmitter mode) (process step 415). MC 105 turns off the laser diodes in projection module 120 (process step 420). Next, MC 105 retrieves target file 210 in memory 110 (process step 425). MC 150 turns on red laser diode 231 and uses either red laser diode 231, or PAN transceiver 150, or both, to establish optical communication link 330 (process step 430). Once, optical communication link 330 is established, MC 150 transmits target file 310 to STB 320 using red laser diode 231 (process step 435). When transfer of target file 310 to STB 320 is complete, projection module 120 resumes normal mode (process step 440).

It may be advantageous to set forth definitions of certain words and phrases used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean: to include, to be included within, to interconnect with, to contain, to be contained within, to connect to or with, to couple to or with, to be communicable with, to cooperate with, to interleave, to juxtapose, to be proximate to, to be bound to or with, to have, to have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A projection system comprising:
    a plurality of laser diodes, each laser diode configured to generate a light beam;
    combiner optics configured to combine a plurality of light beams from the laser diodes to generate an output light beam;
    a MEMS mirror module configured to receive the output light beam from the combiner optics and generate a scanning light beam operable to form an output image on a projection surface; and
    a controller configured to:
        operate the projection system in a first mode in which the projection system projects the output image and to operate the projection system in a second mode in which the projection system transmits data to an external device using a light beam from one of the laser diodes, and
        switch the projection system from the first mode to the second mode in response to an input command received from the external device via a wireless transceiver that is configured to communicate with the external device.

2. The projection system as set forth in claim 1, wherein the controller is configured to switch the projection system from the first mode to the second mode in response to a user input command received from an operator of the projection system.

3. The projection system as set forth in claim 1, wherein the projection system is configured to transmit the data to the external device using a red light beam from one of the laser diodes.

4. The projection system of claim 1, wherein the MEMS mirror module is configured to output the scanning light beam through a lens in the first mode and to output the light beam from one of the laser diodes through the lens in the second mode.

5. The projection system of claim 1, wherein the projection system when in the second mode is configured to transmit the data to the external device by passing the light beam from one of the laser diodes through the combiner optics and the MEMS mirror module to an output of the projection system.

6. The projection system as set forth in claim 1, wherein the projection system is configured in a mobile phone.

7. The projection system as set forth in claim 1, wherein the wireless transceiver comprises a Bluetooth™ transceiver that is configured to transmit the data using a Bluetooth™ protocol.

8. A portable electronic apparatus comprising:
    an embedded projection system comprising:
        a plurality of laser diodes, each laser diode configured to generate a light beam;
        combiner optics configured to combine a plurality of light beams from the laser diodes to generate an output light beam;
        a MEMS mirror module configured to receive the output light beam from the combiner optics and generate a scanning light beam operable to form an output image on a projection surface; and
        a controller configured to:
            operate the embedded projection system in a first mode in which the embedded projection system projects the output image and to operate the embedded projection system in a second mode in which the embedded projection system transmits data to an external device using a light beam from one of the laser diodes, and
            switch the projection system from the first mode to the second mode in response to an input command received from the external device via a wireless transceiver that is configured to communicate with the external device.

9. The portable electronic apparatus as set forth in claim 8, wherein the controller is configured to switch the embedded projection system from the first mode to the second mode in response to a user input command received from an operator of the projection system.

10. The portable electronic apparatus as set forth in claim 8, wherein the embedded projection system is configured to transmit the data to the external device using a red light beam from one of the laser diodes.

11. The portable electronic apparatus as set forth in claim 8, wherein the portable electronic apparatus comprises a mobile telephone.

12. The portable electronic apparatus as set forth in claim 8, wherein the MEMS mirror module is configured to output the scanning light beam through a lens in the first mode and to output the light beam from one of the laser diodes through the lens in the second mode.

13. The portable electronic apparatus as set forth in claim 8, wherein the embedded projection system in the second mode is configured to transmit a video file to the external device using the light beam from one of the laser diodes.

14. The portable electronic apparatus as set forth in claim 8, further comprising:
   a wide area network (WAN) transceiver configured to communicate voice or data traffic over a wide area network.

15. The portable electronic apparatus as set forth in claim 8, wherein the embedded projection system when in the second mode is configured to transmit the data to the external device by passing the light beam from one of the laser diodes through the combiner optics and the MEMS mirror module to an output of the portable electronic apparatus.

16. The portable electronic apparatus as set forth in claim 8, wherein the projection system is configured in a mobile phone.

17. The portable electronic apparatus as set forth in claim 8, wherein the wireless transceiver comprises a Bluetooth™ transceiver that is configured to transmit the data using a Bluetooth™ protocol.

18. A method comprising:
   in a first mode of a projection system:
      generating a plurality of light beams;
      combining the light beams into an output light beam; and
      generating a scanning light beam operable to form an output image on a projection surface using the output light beam;
   in a second mode of the projection system, transmitting data to an external device using one of the light beams; and
   switching the projection system from the first mode to the second mode in response to an input command received from the external device via a wireless transceiver that is configured to communicate with the external device.

19. The method of claim 18, wherein generating the light beams comprises using multiple laser diodes, wherein combining the light beams comprises using combiner optics, and wherein generating the scanning light beam comprises using a MEMS mirror module.

20. The method of claim 19, wherein transmitting the data to the external device comprises passing the light beam from one of the laser diodes through the combiner optics and the MEMS mirror module to an output of the projection system.

* * * * *